(12) United States Patent
Keenan

(10) Patent No.: US 7,905,260 B2
(45) Date of Patent: Mar. 15, 2011

(54) ROUTER DUST COLLECTION ASSEMBLY

(76) Inventor: Richard Keenan, Wakefield, RI (US)

( * ) Notice: Subject to any disclaimer, the term of this patent is extended or adjusted under 35 U.S.C. 154(b) by 0 days.

(21) Appl. No.: 12/349,083

(22) Filed: Jan. 6, 2009

(65) Prior Publication Data

US 2010/0089497 A1    Apr. 15, 2010

Related U.S. Application Data

(60) Provisional application No. 61/010,798, filed on Jan. 12, 2008.

(51) Int. Cl.
*B27G 19/00* (2006.01)
*B23Q 11/00* (2006.01)

(52) U.S. Cl. ...................................... 144/252.1; 409/137

(58) Field of Classification Search ............... 144/135.2, 144/252.1, 252.2, 286.1, 286.5; 408/67, 408/68; 409/137, 182; 83/100; 451/453, 451/456

See application file for complete search history.

(56) References Cited

U.S. PATENT DOCUMENTS

| | | | | |
|---|---|---|---|---|
| 3,022,806 A * | 2/1962 | Johnston | ...................... | 144/252.1 |
| 3,167,260 A * | 1/1965 | Gibbons et al. | ................ | 241/56 |
| 3,905,273 A * | 9/1975 | Shook | ........................... | 409/134 |
| 3,942,411 A * | 3/1976 | Gerber | ......................... | 409/137 |
| 4,037,982 A * | 7/1977 | Clement | ........................ | 408/61 |
| 4,051,880 A * | 10/1977 | Hestily | ....................... | 144/252.1 |
| 4,088,164 A * | 5/1978 | McCord, Jr. | ................ | 144/252.1 |
| 4,090,297 A * | 5/1978 | Wanner et al. | .................. | 30/124 |
| 4,184,226 A * | 1/1980 | Loevenich | ................... | 15/415.1 |
| 4,201,256 A * | 5/1980 | Truhan | ....................... | 144/252.2 |
| 4,367,665 A * | 1/1983 | Terpstra et al. | ................ | 83/100 |
| 4,409,699 A * | 10/1983 | Moorhouse | .................. | 15/415.1 |
| 4,576,072 A * | 3/1986 | Terpstra et al. | .............. | 83/102.1 |
| 4,606,685 A * | 8/1986 | Maier et al. | .................... | 409/137 |
| 4,738,571 A * | 4/1988 | Olson et al. | .................... | 409/137 |
| 4,821,365 A * | 4/1989 | Charters | ........................ | 15/339 |
| 4,822,219 A * | 4/1989 | Wood et al. | ................... | 409/137 |
| 5,145,297 A * | 9/1992 | McGrath, Jr. | ................. | 409/132 |
| 5,370,165 A * | 12/1994 | Stornetta | .................... | 144/144.1 |
| 5,509,454 A * | 4/1996 | Giacometti | ............... | 144/252.1 |
| 5,582,225 A * | 12/1996 | Schank | ..................... | 144/286.1 |
| 5,584,620 A * | 12/1996 | Blickhan et al. | ............. | 409/137 |
| 5,606,767 A * | 3/1997 | Crlenjak et al. | ................ | 15/301 |
| 5,667,565 A * | 9/1997 | Gondar | ............................. | 96/60 |
| 5,779,407 A * | 7/1998 | Tucker et al. | ................. | 409/218 |
| 5,882,155 A * | 3/1999 | Testa, Jr. | ....................... | 409/132 |
| 5,983,445 A * | 11/1999 | Baker | ............................. | 15/339 |
| 5,988,954 A * | 11/1999 | Gaskin et al. | .................. | 408/67 |
| 5,993,124 A * | 11/1999 | Cooper et al. | ............... | 409/137 |
| 6,019,148 A * | 2/2000 | Hansen | ......................... | 144/3.1 |
| 6,036,412 A * | 3/2000 | Dalla | ............................ | 409/136 |
| 6,079,078 A * | 6/2000 | Byington | ....................... | 15/339 |
| 6,196,775 B1 * | 3/2001 | Aubin et al. | .................. | 409/137 |

(Continued)

*Primary Examiner* — Dana Ross
*Assistant Examiner* — Jennifer Chiang

(57) ABSTRACT

A dust collector is provided for use with a router that is mounted to the underside of a router table. The device serves as a means for collecting dust from both upper and lower surfaces of a cutting tool. The dust collector includes a flexible cup attachable to the underside of the router table, a vacuum hose opening on the cup connectable to a workshop vacuum hose and reducer fitting in combination are attachable to a router table fence and to one of two small openings of a "T" connector fitting on the other end, a vacuum hose attachable to the vacuum hose opening of the cup on one end and attachable to the other of two small openings of the "T" connector on the other end, a larger opening on the "T" connector connectable to a vacuum hose of a workshop vacuum, which in combination.

10 Claims, 7 Drawing Sheets

U.S. PATENT DOCUMENTS

| | | | |
|---|---|---|---|
| 6,293,321 B1 * | 9/2001 | Chiang | 144/252.1 |
| 6,443,676 B1 * | 9/2002 | Kopras | 409/182 |
| 6,454,499 B1 * | 9/2002 | Gittel et al. | 409/131 |
| 6,640,854 B2 * | 11/2003 | Kalmbach et al. | 144/252.1 |
| 6,722,239 B2 * | 4/2004 | Liao et al. | 83/100 |
| 6,772,664 B2 * | 8/2004 | Chiang | 83/100 |
| 6,835,030 B2 * | 12/2004 | Pozgay et al. | 408/182 |
| 6,854,937 B1 * | 2/2005 | Weiss | 409/137 |
| 6,887,146 B2 * | 5/2005 | Staas et al. | 454/66 |
| 6,997,222 B2 * | 2/2006 | Rosendahl | 144/371 |
| 7,044,039 B2 * | 5/2006 | Powell | 83/100 |
| 7,044,843 B1 * | 5/2006 | Lin | 451/178 |
| 7,198,442 B2 * | 4/2007 | Waldron | 409/137 |
| 7,290,967 B2 * | 11/2007 | Steimel et al. | 409/137 |
| 2004/0055665 A1 * | 3/2004 | Wang | 144/252.1 |
| 2004/0076485 A1 * | 4/2004 | Kraus | 409/137 |
| 2006/0019585 A1 * | 1/2006 | Zayat et al. | 451/344 |
| 2006/0046625 A1 * | 3/2006 | Andreas | 451/453 |
| 2007/0251198 A1 * | 11/2007 | Witter | 55/300 |

* cited by examiner

ROUTER DUST COLLECTION ASSEMBLY

CROSS-REFERENCE TO RELATED APPLICATIONS

This application is related to and claims priority from earlier filed U.S. Provisional Patent Application No. 61/010,709, filed Jan. 12, 2008.

BACKGROUND OF THE INVENTION

The present invention relates generally to dust collection systems for shop tools. More specifically, the present invention relates to dust collection systems that attach to router tables and allow for the removal of the dust and chips that are generated by high volume, bottom up routing which has become the process of choice for many woodworkers in recent years.

Since the introduction of the router table, users have typically had to cope with the very high volume of flying sawdust particles and wood chips generated by these devices. According to the National Institute for Occupational Safety and Health (NIOSH), wood dust particles are known to cause health problems including eye and skin irritation, allergy, reduced lung function, asthma, and nasal cancer. Further, wood dust is known to be a human carcinogen. As a result, in order to protect themselves workers have undertaken the cutting of wood outdoors, wearing masks, building makeshift containers, enclosing the base of the router table or building plastic enclosures around their work area. One difficulty that arises is that cutting wood outdoors is often limited by poor weather conditions. As a result, work schedules are often disrupted when conditions do not permit cutting outdoors. Additionally, dust particles and wood chips that drop to the ground are frequently tracked into living areas of the home and get lodged in carpets and in furnishings where they can create an unhealthy environment. Additionally, since routers are inverted when connected to the underside of these router tables, the sawdust drops directly into the router motor often causing premature motor burnout and costly replacement.

In the prior art, there are a number of products that have been designed to collect sawdust generated by routers such as U.S. Pat. No. 3,022,806 (Johnson) which discloses a guard that surrounds the dust escape openings of a "conventional" router and includes a dust collection cavity with a dust port which can be attached to a vacuum hose. However, a wide variety of new routers have replaced the "conventional" router and most have unique designs that would preclude the attachment of the Johnson device. Further, the Johnston device causes the mechanism for raising and lowering of the cutting tool to become fixed and no longer adjustable, taking away the ability to cut at different heights and depths with the same cutting tool.

U.S. Pat. No. 3,837,383 (Ko) provides a tubular or cylindrical collecting device that includes a tangentially arranged suction apparatus for creating a partial vacuum within the device used to remove dust generated by contact between a tool and a work piece. This apparatus may be adaptable to some routers but also would not allow for adjustment of the cutting tool, would not collect dust from the table surface and does not protect the router motor from burnout.

U.S. Pat. No. 4,051,880 (Hestily) includes a portable electric router having a dust chamber formed below a motor mounted to a base having two handles one of which is in communication with the chamber that in turn is connected to a blower and dust bag fixed to the top of the motor. The Hestily device is for top down routing and is evidently adaptable to a router table for bottom up routing but in such an arrangement it would not collect dust from the table surface and does not protect the router motor from burnout. It is costly to produce and is not adaptable to existing routers. Wood workers would not be able to use their existing routers.

U.S. Pat. No. 4,409,699 (Moorehouse) consists of a base attached to any type of power tool that makes by products such as wood chips, etc. The base is provided with a neck and a hose is connected into the neck, which in turn can be attached to a vacuum system. A slidable platform includes an aperture and an air chamber that allows the by by-products to travel into the neck and to a vacuum system. A post is connected to the base and another to the platform and is biased with a spring. While it appears useful for top down routing it is not adaptable for bottom up routing, as the air chamber of the assembly would not allow for a flush fit of a router to the underside of a router table.

U.S. Pat. No. 4,738,571 (Olson et al.) consists of a base with a dust port, a sub-base having a large cavity attached to the base which both in symmetry attach to a "conventional" router. While this apparatus appears to be attachable to the underside of a router table, it appears that the small hole in the base will limit the depth of some cuts, as collets of routers will not pass through it. In addition, provisions are not evident for the large variety of different dimension router bases that are currently in production. Many new routers are attached to lift mechanisms designed to allow cuts at very close tolerances and this apparatus would require a major re-design to accommodate such lifts. In addition, the cited apparatus has no provision for simultaneously collecting sawdust and chips from both top and bottom surfaces of a router table.

U.S. Pat. No. 4,750,536 (Grisley) is a waste attachment for a router which is a hollow arm which pivots as the work piece passes through the cutting tool and which guides sawdust and chips to a vacuum port. This invention by its design is for hand held routing and not attachable to either top or bottom of a router table.

U.S. Pat. No. 5,396,937 (Clausen) is a router table for supporting a normally hand held router which enables precise angular cuts and has a hollow housing with a dust port for connecting to a vacuum. The housing is designed to collect dust and is located on the top of the table and behind a fence that guides the work piece. This invention appears capable of collecting sawdust and chips on end cuts and not on dado cuts. Further, it does not have any means for collecting the dust that falls through the bottom of the router table nor does it protect the router motor from accumulating dust and motor burn out.

U.S. Pat. No. 5,503,203 (Stornetta) is a cylindrical housing or "dust hood" for a portable router which surrounds the dust escape openings on either side of a cutting tool. A dust port is attached to the housing and is attachable to a vacuum source. The invention also includes a sub-base that is attached to the bottom plate of the dust router. It is not likely that a router having this attachment would be attachable to the underside of a router table but should it be attachable there is no provision for collecting dust on the top surface of the router table nor is there any means for protecting the router motor from accumulating dust and motor burn out.

U.S. Pat. No. 5,553,644 (Adams) comprises a fence support of hollow rectangular configuration defining a chamber that is connectable to a vacuum source for removal of dust and chips produced by a cutting tool such as a router. This invention appears to be adaptable to a variety of router tables and appears to be capable of collecting sawdust and chips from the top of the table surface. It does not have any means for collecting dust that falls through the bottom of the router table nor does it protect the router motor from accumulating dust and motor burn out.

U.S. Pat. No. 5,584,620 (Blickhan et al.) provides a router with a cutter head containing the drive motor so that the cutter head is held in a displaceable manner at guide columns which are secured to a base plate which has a suction intake channel which surrounds the central opening. The intake channel is connected to a suction extraction channel, which is connectable to a vacuum source. It is not likely that this router would be attachable to the underside of a router table but should it be attachable there is no provision for collecting dust on the top surface of the router table nor is there any means for collecting dust which falls through the bottom of the router table or for protecting the router motor from accumulating dust and motor burn out.

U.S. Pat. No. 5,611,378 (Brazell) is router table assembly with a tiltable table subassembly that allows variation in positioning the router axis and includes a router mounting plate specifically designed for the table and a unique table design. The table and mounting plate have connecting vacuum channels with a tube connectable to a vacuum source. The design of the channels is such that slivers of wood are likely to clog the dust and chip escape route and render the system inoperable. Aside from this issue, the channels do not appear to be of sufficient height to accommodate many of the mid and larger size cutting tools that are currently on the market. As such, much of the flying dust and chips would not be collected by the system but would fly either above or below the cutting tool. It appears that it may not protect the motor from accumulating dust and motor burn out. An additional limitation is the fact that the dust collection system is built into the table and is not adaptable to the many other router tables currently on the market—it is not a universal fit.

U.S. Pat. No. 5,993,124 (Cooper) is a system that includes a router sub-base adapted for connection to a router. The system includes lower and upper vacuum flow paths configured to evacuate dust from within and beneath the router sub-base. This system is designed for cutting edges of work pieces by hand and not for use with a router table and is not attachable to a router table. The design is such that dust and chips are collected to the rear side of the router away from the cutting tool with dust and chips likely escaping from the front side of the cutting operation. There is no provision to collect dust and chips coming from this area. In addition, with this system installed on a router, dust and chip collection will not be possible for dado types of cuts and it is not a universal fit for routers.

U.S. Pat. No. 7,290,967 (Steimel et al.) is a device attachable to a router that consists of rotatable dust trap able to be connected with a footplate of a router and arranged to the side of the routing tool underneath the footplate and such dust trap being open toward the routing tool. This device is designed for cutting edges of work pieces by hand and not for use with a router table and is not attachable to a router table. The design is such that dust and chips are collected to the rear side of the router away from the cutting tool with dust and chips likely escaping from the front side of the cutting operation. There is no provision to collect dust and chips coming from this area. In addition, with this system installed on a router, dust and chip collection will not be possible for dado types of cuts nor will the use of an adjustable fence be possible without removing the dust trap and rendering dust and chip collection impossible.

Another device in the marketplace is a dust collector for a router table that consists of a dust port which attaches to a specially designed insert and which fits into a router base. When a vacuum source attaches to the dust port, dust and chips can be evacuated from under the router when doing dado cuts. This specially designed insert is for a proprietary router base and is not a universal fit. The dust port is a circular cup with a narrow rectangular port and is made of a hard plastic material. There is no provision for collecting dust and chips from the top surface of router tables when doing end cuts, it's only function is for collecting dust when making dado cuts. In addition, while similar in design to the present invention, the dust port is not a universal fit and being made of hard plastic will require removal when router collets are adjusted in height to accommodate different size cuts. The contour of the inner surface of the dust port is flat on the bottom surface and flat on the side surface, which will likely contribute to clogging created by chips collecting in the corners of the flat surfaces.

Accordingly, there is a need to provide a dust collector that is adaptable to any router, router table and/or any router table insert and which is attachable to router table fences equipped with dust ports. There is a further need for a dust collector which collects sawdust and chips from both the top and bottom surfaces of the router table and which collects dust and chips that fall down and away from the cutting tool and simultaneously collects dust and chips that fly up and away from the cutting tool wile also preventing dust and chip accumulation in router motors thereby maintaining router motor cooling efficiency and preventing premature motor burn out.

BRIEF SUMMARY OF THE INVENTION

In this regard, the present invention provides for a dust collector for use with a router that is mounted to the underside of a router table. The dust collector comprises a flexible cup attachable to the underside of the router table, a vacuum hose opening on the cup connectable to a workshop vacuum, a vacuum hose and reducer fitting in combination are attachable to a router table fence on the one end and attachable to one of two small openings of a "T" connector fitting on the other end, a vacuum hose attachable to the vacuum hose opening of the cup on one end and attachable to the other of two small openings of the "T" connector on the other end, a larger opening on the "T" connector connectable to a vacuum hose of a workshop vacuum, which in combination, provide for inexpensive and convenient means for directing dust away from both upper and lower surfaces of a cutting tool and into the workshop vacuum when an operator uses such device while making dado or end cuts on a piece of material.

It is accordingly an object of the present invention to provide a dust collector that is adaptable to any router.

It is a further object of the present invention to provide a dust collector which is adaptable to any router table and is adaptable to any router table insert and which is attachable to router table fences equipped with dust ports It is still a further object of the present invention to provide a dust collector that becomes a plenum when attached to a workshop vacuum.

It is further still an object of the present invention to provide a dust collector which can be used in combination with a router lift.

It is also an object of the present invention to provide a dust collector which collects sawdust and chips from both the top and bottom surfaces of the router table and which collects dust and chips that fall down and away from the cutting tool and simultaneously collects dust and chips that fly up and away from the cutting tool;

It is another object of the present invention to provide a dust collector that sawdust and chops generated when performing both end and dado cuts.

It is another object of the present invention to provide a dust collector that can remain in place when cutting tools are being adjusted or replaced.

It is still a further object of the present invention to provide a dust collector that prevents dust and chip accumulation in router motors thereby maintaining router motor cooling efficiency and preventing premature motor burn out.

These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
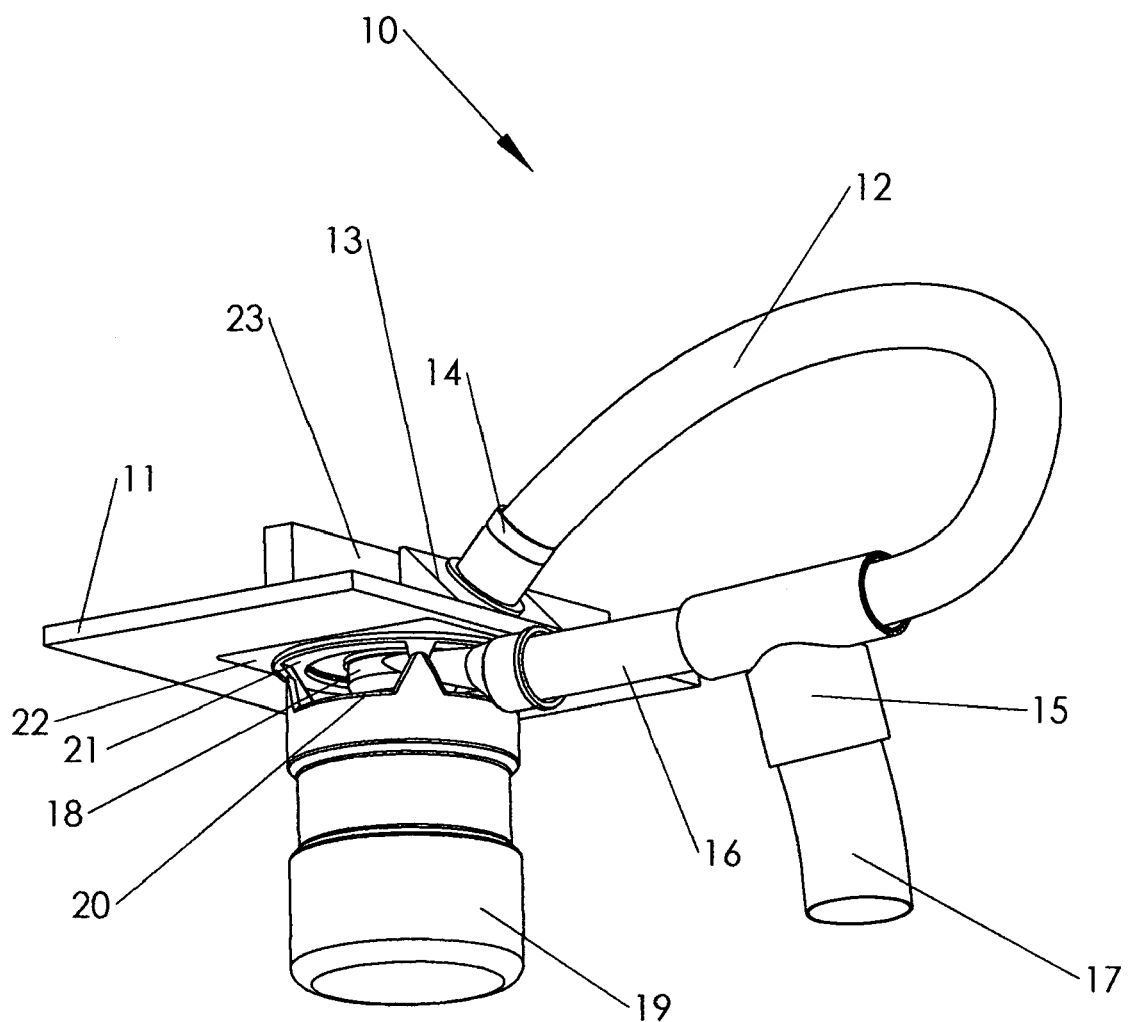
FIG. 1 is a perspective view of the router table sawdust collector mechanism in accordance with the present invention.

Now referring to the drawings, the dust collector system of the present invention is shown and generally illustrated in the figures. Turning to FIG. 1 the dust collector system 10 can be seen attached to a wood working apparatus such as a router table 11 in accordance with the present invention. The dust collector system 10 includes a flexible hose 12 connected on one end to a router table fence 23 by way of vacuum opening 13 and by means of a vacuum hose reducer 14 and on the other end to a vacuum hose "T" connector 15. A second flexible hose 16 is connected on the opposite end of the "T" connector 15 and to a flexible cup 18. A clamp type of mechanism (not shown) may be used to clamp hose 16 to the underside of the router table 11. The remaining opening of the "T" connector 15 is attached to the first end of a vacuum hose 17 and the second end of the vacuum hose 17 is attached to a vacuum (not shown) on the other end. The flexible cup 18 is positioned inside a router 19 in a dust evacuation cavity 20 and is attached to a removable router table insert ring 21, which connects to a removable router table insert 22.

Figure 2:
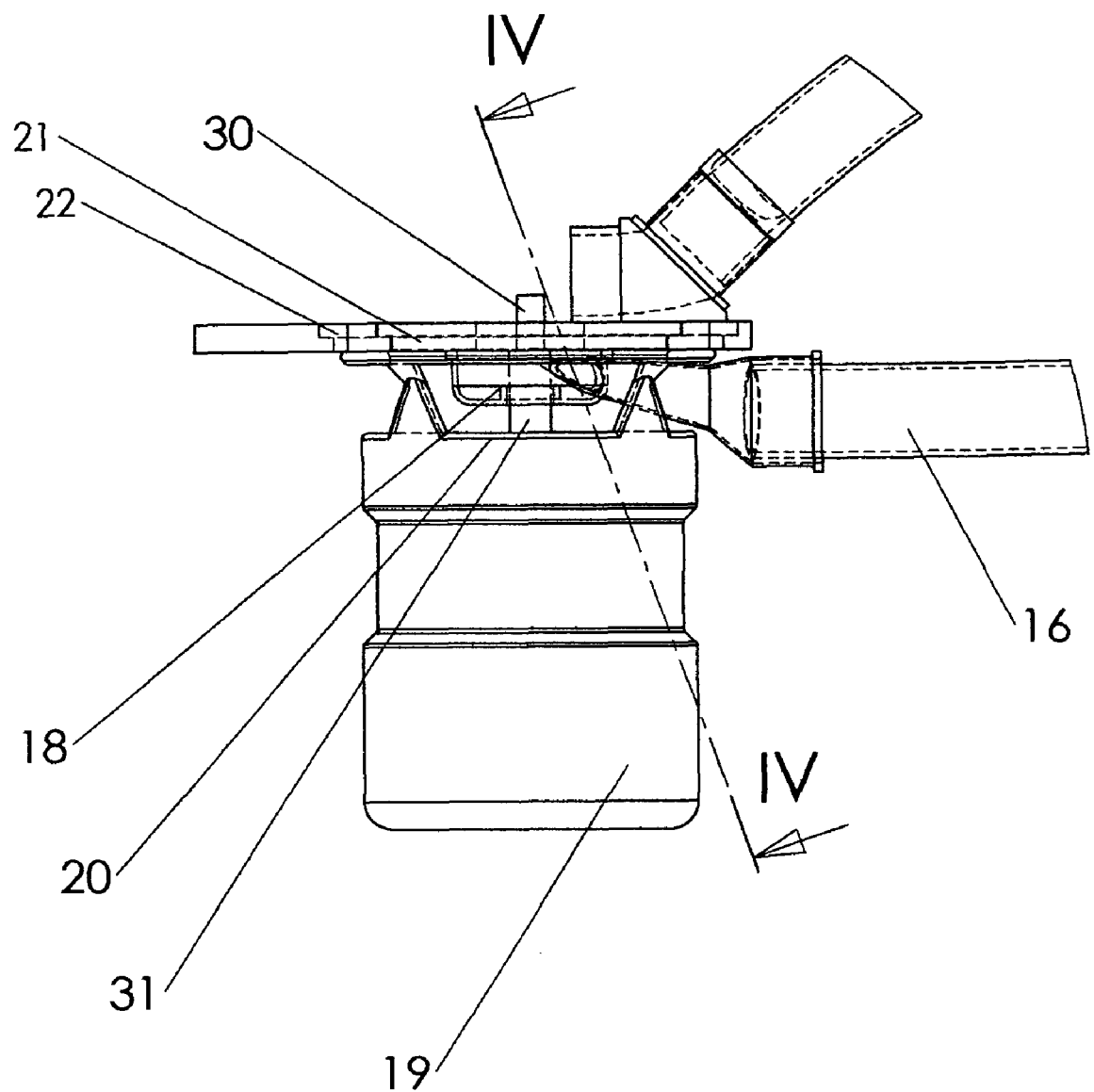
FIG. 2 is a perspective view of the cup portion of the sawdust collector of the present invention.

Turning now to FIG. 2, the flexible cup 18 can be seen inserted into the dust evacuation cavity 20 of the router 19. The cup 18 is attached to the removable router table insert ring 21 by means of an attachment mechanism. In the scope of the present invention such an attachment mechanism may be hook and loop fastener, a bracket, bonding materials or screws. The cup 18 being attached to the insert ring 21 is inserted into the dust evacuation cavity 20 and over a cutting tool 30 and a cutting tool collet 31 of the router 19 so that the vacuum connection port of the cup 18 faces to the rear of router table 11.

Figure 3:
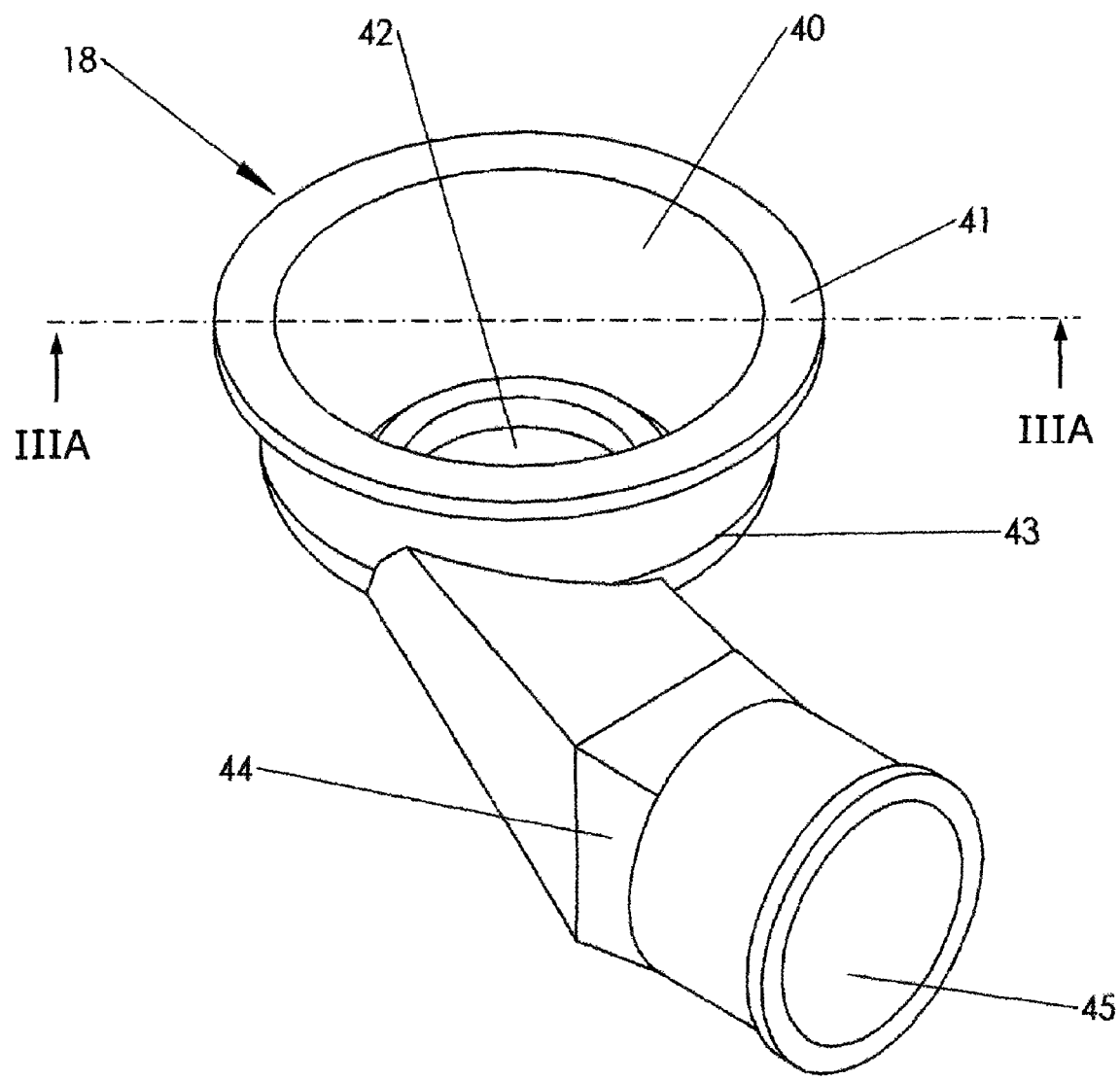
FIG. 3 is a perspective view of the cup in a cavity of a router.

FIG. 3 depicts the flexible cup 18 in accordance with the invention. The cup 18 is made of flexible, heat resistant material. Preferably the cup 18 is made of a synthetic rubber such as silicone although a heat resistant rubber or elastomer may also be employed. An upper opening 40 of the cup 18 matches the typical outside diameter of the smallest removable router table insert rings less the dimension of a narrow flange 41. A lower opening 42 of the cup 18 is of such dimension to allow for the largest of router collets to spin without touching the cup 18 yet small enough to limit the escape of dust. A bottom edge wall 43 of the cup 18 is rounded up to the lower opening 42. Integral to the cup 18 is a flexible vacuum connection port 44 into which the flexible hose 16 is inserted into opening 45. The vacuum connection port 44 slopes downward and then outward at such dimensions to accommodate various sizes and shapes of routers and router tables. Further the vacuum connection port 44 is positioned tangential to the left side of the cup 18 in order to maximize the efficient evacuation of sawdust and chips which, when looking from the top down, travel in a counter-clockwise direction off the cutting tool surface.

Figure 3A:
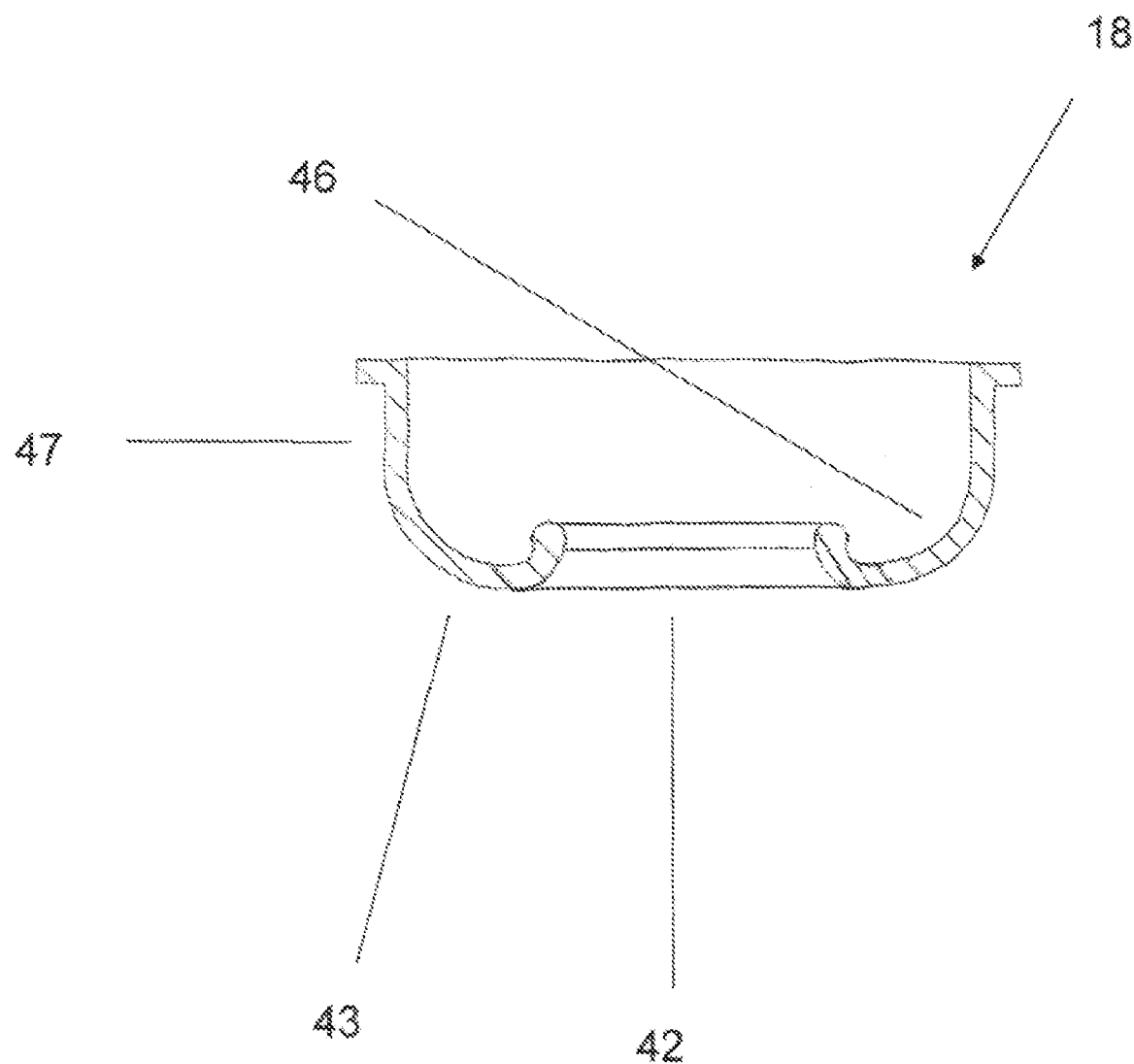
FIG. 3A is a cross sectional view of the cup
Figure 3B:
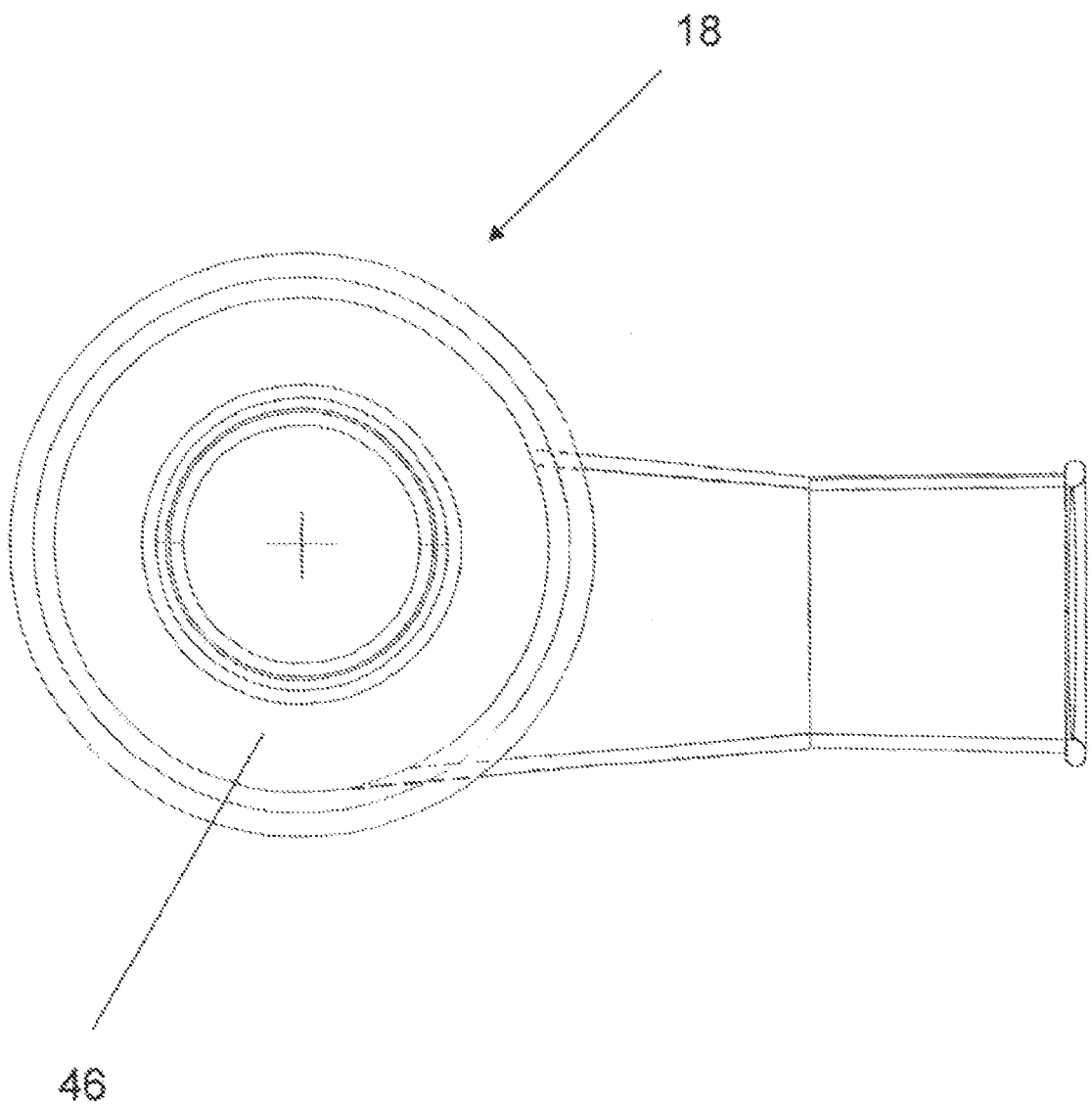
FIG. 3B is a top view of the cup

FIG. 3A is a cross sectional view of the cup which shows the bottom wall 43 of the cup 18 rounded up to the lower opening 42. A rounded contoured channel 46 is formed in the bottom of the cup between a sidewall 47 and the bottom wall 43, the sidewall 47 being perpendicular to the bottom wall 43.

FIG. 38 is a top view of cup 18 that shows the continuous rounded contour channel 46 which encircles the entire interior of the cup 18.

Figure 4:
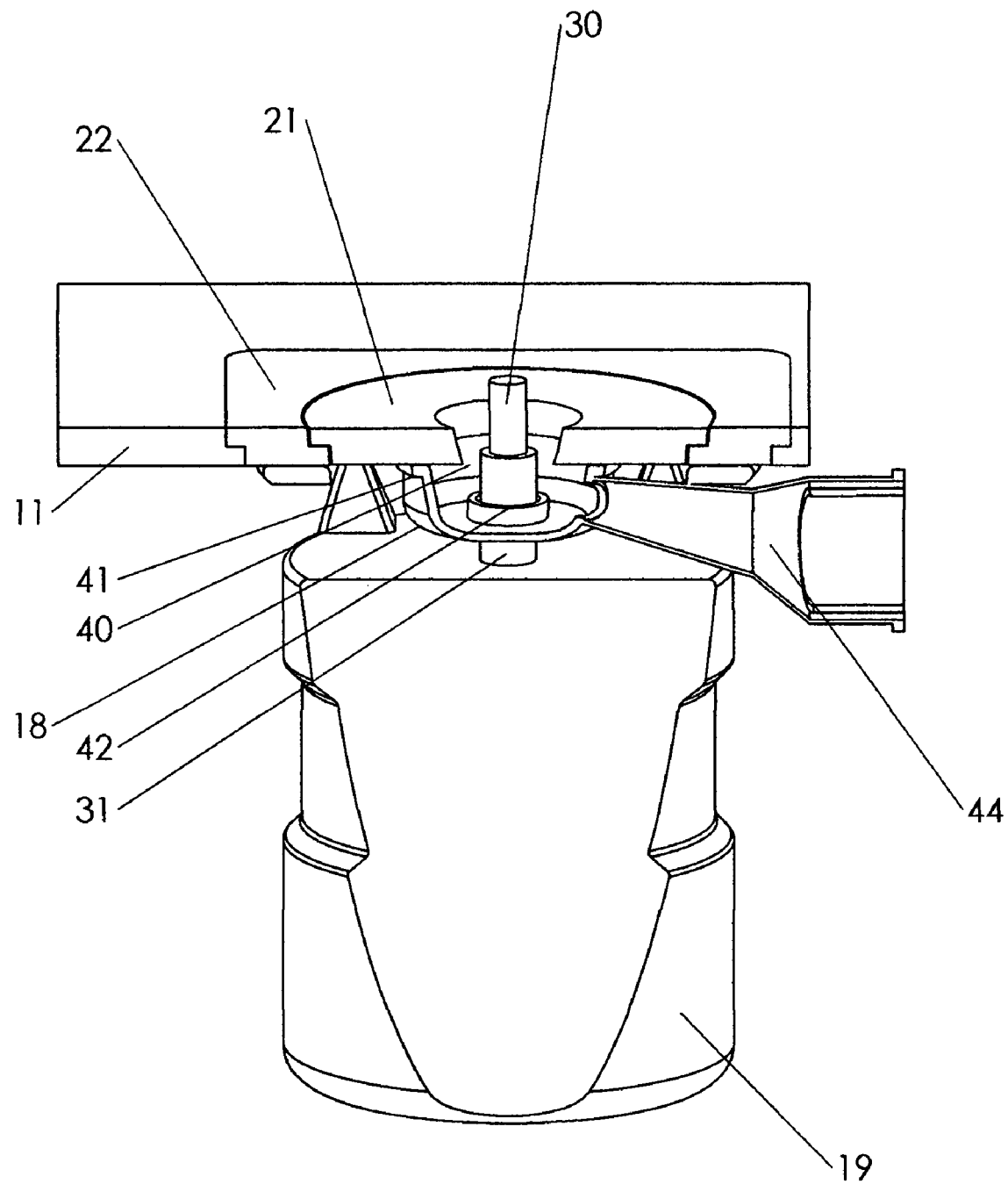
FIG. 4 is a cross sectional view of the cup in the cavity of the router.

FIG. 4 is a cross-sectional view taken through the cup 18 that shows the placement of cup 18 in relation to the router table 11, the removable router insert 22, the removable router table insert ring 21, the router 19, the collet 31 and the cutting tool 30. It also shows the position of the upper opening 40, the lower opening 42, the flange 41 and the vacuum connector 44 of the cup 18. The cup 18 is positioned in place and ready for operation.

Figure 5:
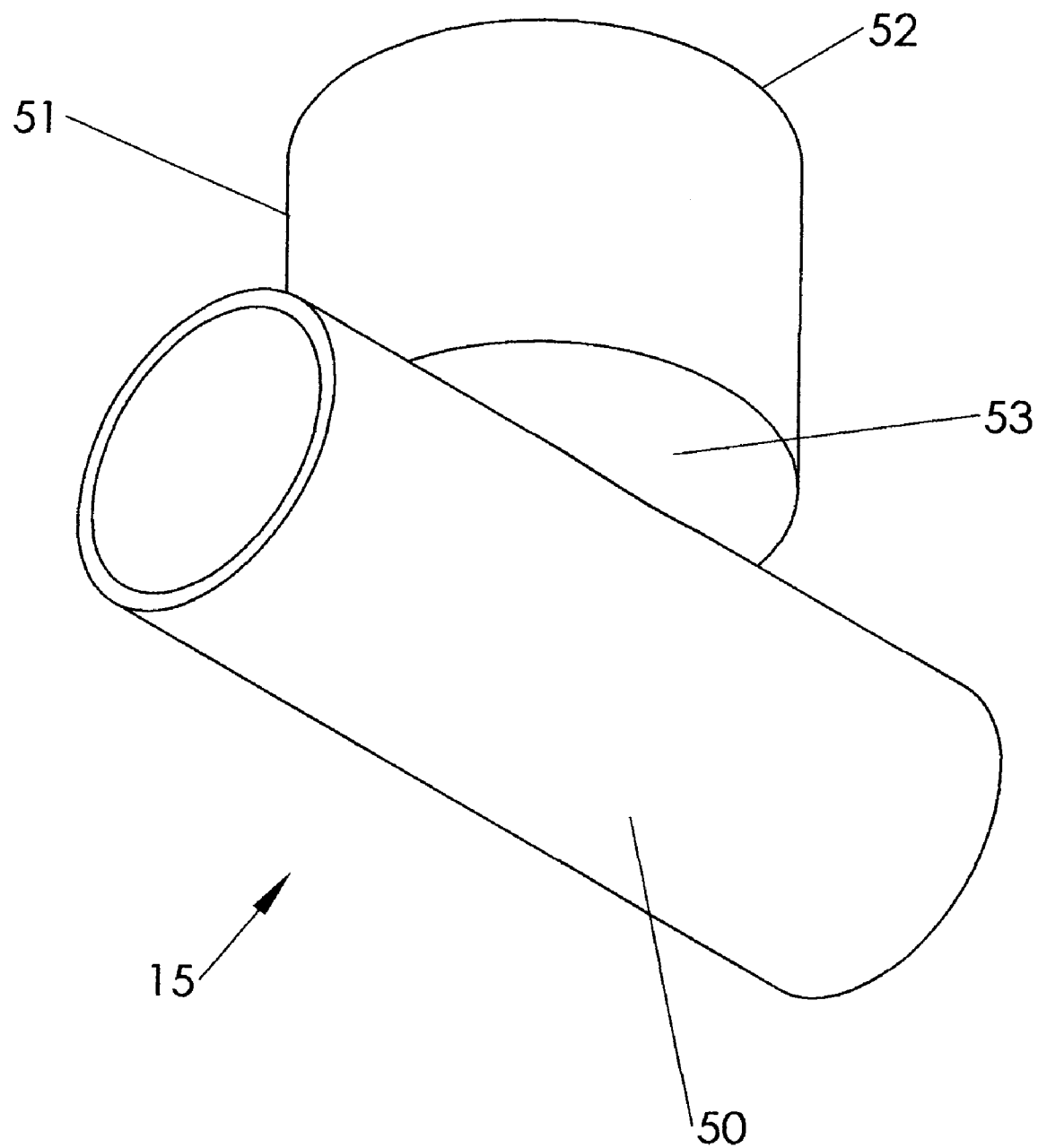
FIG. 5 is a perspective view of a T connector employed in the context of the present invention.

FIG. 5 depicts a vacuum "T" connector 15. The smaller openings at the ends of section 50 connect to hoses 12 and 16 as shown in FIG. 1 and the largest opening 52 at the end of section 51 connects to the vacuum hose 17 as shown in FIG. 1. Hoses 12 and 16 adapt to the "T" connector 15 so that the angle of the "T" connector 15 is adjustable to the desired angle to accommodate the vacuum hose 17. Section 53 of the "T" fitting is tapered into section 50 creating an opening sufficient to maximize the air flow in the flow path coming from the cutting tool 30 of the router 19. The "T" connector 15 is preferably made of plastic and is lightweight.

In operation, the flexible cup 18 while shown attached to the removable router table insert ring 21 may also be attached directly to the underside OF a removable router table insert. Should a router table not include a removable router table insert ring the cup is attached directly to the underside of the table itself. In this case, the flexible cup 18 must be attached to the table prior to the installation of the router. However, when a router table has the removable router table insert ring, the operator may install cup 18 after the router has been attached to the router table. When installing the cup 18, it will be centered over the underside of the removable router table insert 21 or universally over the cutting tool hole of either the router table, or the removable router table insert and is secured in place by an attachment mechanism such as hook and loop fastener, a bracket, bonding materials or screws. When cup 18 is being installed on the removable router table insert ring, the vacuum connection port 44 is pinched so that it will easily pass through the dust evacuation cavity 20 opening of the router 19. Cup 18 being of flexible material and having dimensions which match up to virtually all router tables and routers make it a universal fit and easy to install regardless of brand, size or configuration of the router table and router.

Once the cup 18 is installed, the flexible hose 12 is attached to the reducer 14, the reducer 14 is inserted into the vacuum port 13 of the fence 23. The remaining end of hose 12 is inserted into the "T" connector 15. Flexible hose 16 is then inserted into opening 45 of cup 18 on the one end and into the remaining small opening of "T" connector 15. A clamp mechanism (not shown) may be used to clamp hose 16 to the underside of the router table 11 to minimize the movement of the hose 16 and "T" connector 15. The vacuum source hose 17 is inserted into the large opening 52 of connector 15 and attached to the vacuum source (not shown).

In operation, a flow path exists in the direction consistent with the placement of the vacuum port 44 of cup 18 and consistent with the direction of the flow of sawdust and chips coming off the cutting tool as either end or dado cuts are made by an operator. The design of the current invention allows for the simultaneous removal of sawdust and chips from above and below the cutting tool regardless of the depth or type of cut (end or dado). The efficient removal and virtual elimination of escaping sawdust and chips alleviates the necessity for periodic router motor cleaning and prevents premature router motor burnout. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A sawdust collector for a woodworking apparatus having a horizontal worktable, a guide fence, a dust port in the guide fence, a router having a cavity therein and operably attached to the underside of the worktable with a cutting tool mounted into a collet and adjustable upward through the worktable, said router generating chips and sawdust when in operation, the sawdust collector comprising:
   a flexible cup having a bottom wall with sides that extend upwardly therefrom forming a cavity therein, a vacuum port formed in a portion of the side thereof and an opening formed in the bottom wall;
   a first vacuum hose having a first end and a second end, the first end attached to the vacuum port; and
   a second vacuum hose having a first end and a second end, the first end attached to the dust port in the guide fence, wherein the second ends of the first and second vacuum hoses are configured for attachment to a vacuum device, the flexible cup being positioned adjacent a bottom surface of the work table within the cavity of the router such that the collet and cutting tool of the router extend through the opening in the bottom wall of said flexible cup;
   wherein the bottom wall of the cup has a continuous, rounded contoured channel formed therein, the contoured channel being circumferential to and encircling the entire said opening in said bottom wall;
   wherein the cup is made of a flexible, heat resistant material.

2. A sawdust collector of a Claim 1, further comprising:
   a T connector having three ports extending therefrom wherein the second ends of the first and second vacuum hoses are operably attached to two of the ports and the third port is configured for attachment to a vacuum device.

3. The sawdust collector of claim 1, wherein the vacuum port in the cup is positioned tangential to the direction of the flow path.

4. The sawdust collector of Claim 1, wherein the cup is attached to the underside of the workable using fastening means selected from the group consisting of: brackets, screws, adhesives and hooks and loop fastener.

5. The sawdust collector of claim 1, wherein the bottom wall of the cup is perpendicular to the side wall of the cup and is contoured upwardly to the opening in the bottom wall.

6. A sawdust collector for a woodworking apparatus having a horizontal worktable, a guide fence, a dust port in the guide fence, a router having a cavity therein and operably attached to the underside of the worktable with a cutting tool mounted into a collet and adjustable upward through the worktable, said router generating chips and sawdust when in operation, the sawdust collector comprising:
   a flexible cup having a bottom wall with sides that extend upwardly therefrom forming a cavity therein, a vacuum port formed in a portion of the side thereof and an opening formed in the bottom wall;
   a first vacuum hose having a first end and a second end, the first end attached to the vacuum port; and
   a second vacuum hose having a first end and a second end, the first end operably affixed adjacent the upper surface of the woodworking apparatus, wherein the flexible cup being positioned adjacent the bottom surface surrounding a cutting tool of the woodworking apparatus such that the cutting tool extends through the opening in the bottom wall of said flexible cup, wherein the seconds ends of the first and second vacuum hoses are configured for attachment to a vacuum device;
   wherein the bottom wall of the cup has a continuous, rounded contoured channel formed therein, the contoured channel being circumferential to and encircling the entire said opening in said bottom wall;
   wherein the cup is made of a flexible, heat resistant material.

7. A sawdust collector of a Claim 6, further comprising:
   a T connector having three ports extending therefrom wherein the second ends of the first and second vacuum hoses are operably attached to two of the ports and the third port is configured for attachment to a vacuum device.

8. The sawdust collector of claim 1, wherein the vacuum port in the cup is positioned tangential to the direction of the flow path.

9. The sawdust collector of Claim 6, wherein the cup is attached to the lower surface using fastening means selected from the group consisting of: brackets, screws, adhesives and hooks and loop fastener.

10. The sawdust collector of claim 1, wherein the bottom wall of the cup is perpendicular to the side wall of the cup and is contoured upwardly to the opening in the bottom wall.

* * * * *